United States Patent
Gonze et al.

(10) Patent No.: US 8,661,790 B2
(45) Date of Patent: Mar. 4, 2014

(54) ELECTRONICALLY HEATED $NO_x$ ADSORBER CATALYST

(75) Inventors: Eugene V. Gonze, Pinckney, MI (US); Michael J. Paratore, Jr., Howell, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 13/290,671

(22) Filed: Nov. 7, 2011

(65) Prior Publication Data

US 2013/0111886 A1 May 9, 2013

(51) Int. Cl.
*F01N 3/00* (2006.01)
*F01N 3/02* (2006.01)

(52) U.S. Cl.
USPC ........... 60/286; 60/295; 60/299; 60/300; 60/301

(58) Field of Classification Search
USPC ............... 60/286, 295, 299, 300, 301
See application file for complete search history.

(56) References Cited

U.S. PATENT DOCUMENTS

| | | | | |
|---|---|---|---|---|
| 7,210,288 B2 * | 5/2007 | Bandl-Konr et al. | ........... | 60/297 |
| 2010/0132635 A1 * | 6/2010 | McCarthy et al. | ................ | 123/3 |
| 2010/0290957 A1 * | 11/2010 | Yoshida et al. | ............... | 422/109 |

* cited by examiner

*Primary Examiner* — Thomas Denion
*Assistant Examiner* — Dapinder Singh
(74) *Attorney, Agent, or Firm* — Cantor Colburn LLP

(57) ABSTRACT

An exhaust gas treatment system for an internal combustion engine is provided, and includes an exhaust gas conduit, an upstream selective catalytic reduction ("SCR") device, an electrically heated catalyst ("EHC") device, an oxidation catalyst ("OC") device, a downstream SCR device, and a control module. The EHC device is in fluid communication with the exhaust gas conduit and is configured to receive the exhaust gas. The EHC device is located downstream of the upstream SCR device and is selectively activated to produce heat. The OC device is in fluid communication with the exhaust gas conduit, and is selectively heated by the EHC device. At least one of the EHC device and the OC device have a $NO_x$ adsorber catalyst disposed thereon for selectively adsorbing $NO_x$ below a threshold temperature and substantially releasing $NO_x$ above the threshold temperature.

20 Claims, 2 Drawing Sheets

ELECTRONICALLY HEATED $NO_x$ ADSORBER CATALYST

FIELD OF THE INVENTION

Exemplary embodiments of the invention relate to exhaust gas treatment systems for internal combustion engines and, more particularly, to an exhaust gas treatment system having an electrically heated catalyst ("EHC") that is selectively activated and a $NO_x$ adsorber catalyst.

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst device ("OC"). The OC device includes a flow-through substrate and a catalyst compound applied to the substrate. One type of exhaust treatment technology for reducing $NO_x$ emissions is a selective catalytic reduction ("SCR") device that may be positioned downstream of the OC device. The SCR device includes a substrate, having a SCR catalyst compound applied to the substrate. A reductant is typically sprayed into hot exhaust gases upstream of the SCR device. The reductant may be a urea solution that decomposes to ammonia ("$NH_3$") in the hot exhaust gases and is adsorbed by the SCR device. The ammonia then reduces the $NO_x$ to nitrogen in the presence of the SCR catalyst. However, the SCR device also needs to reach a threshold or light-off temperature to effectively reduce $NO_x$. Following a cold start of the engine, the SCR device has not attained the respective light-off temperature, and therefore generally may not effectively remove $NO_x$ from the exhaust gases. Accordingly, it is desirable to provide an efficient approach for effectively removing $NO_x$ from the exhaust gases prior to the SCR device reaching the respective light-off temperature.

SUMMARY OF THE INVENTION

In one exemplary embodiment of the invention, an exhaust gas treatment system for an internal combustion engine is provided, and includes an exhaust gas conduit, an upstream selective catalytic reduction ("SCR") device, an electrically heated catalyst ("EHC") device, an oxidation catalyst ("OC") device, a downstream SCR device, and a control module. The exhaust gas conduit is in fluid communication with, and is configured to receive an exhaust gas from the internal combustion engine. The exhaust gas contains oxides of nitrogen ("$NO_x$") and hydrocarbons. The upstream SCR device is in fluid communication with the exhaust gas conduit and is configured to receive the exhaust gas. The EHC device is in fluid communication with the exhaust gas conduit and is configured to receive the exhaust gas. The EHC device is located downstream of the upstream SCR device. The EHC device is selectively activated to produce heat. The EHC device includes a monolith. The OC device is in fluid communication with the exhaust gas conduit. The OC device is selectively heated by the EHC device. At least one of the monolith of the EHC device and the OC device have a $NO_x$ adsorber catalyst disposed thereon for adsorbing $NO_x$ below a threshold temperature and substantially releasing $NO_x$ above the threshold temperature. The downstream SCR device is in fluid communication with the exhaust gas conduit and configured to receive the exhaust gas. The downstream SCR device is located downstream of the OC device. The downstream SCR device including a downstream SCR activation temperature based on a downstream SCR temperature profile. The downstream SCR activation temperature indicates the downstream SCR device is within a specified range of a respective-light-off temperature of the downstream SCR device. The control module is in communication with the EHC device. The control module includes control logic for determining the downstream SCR temperature profile. The control module includes control logic for activating the EHC device if the downstream SCR temperature profile is above the downstream SCR activation temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
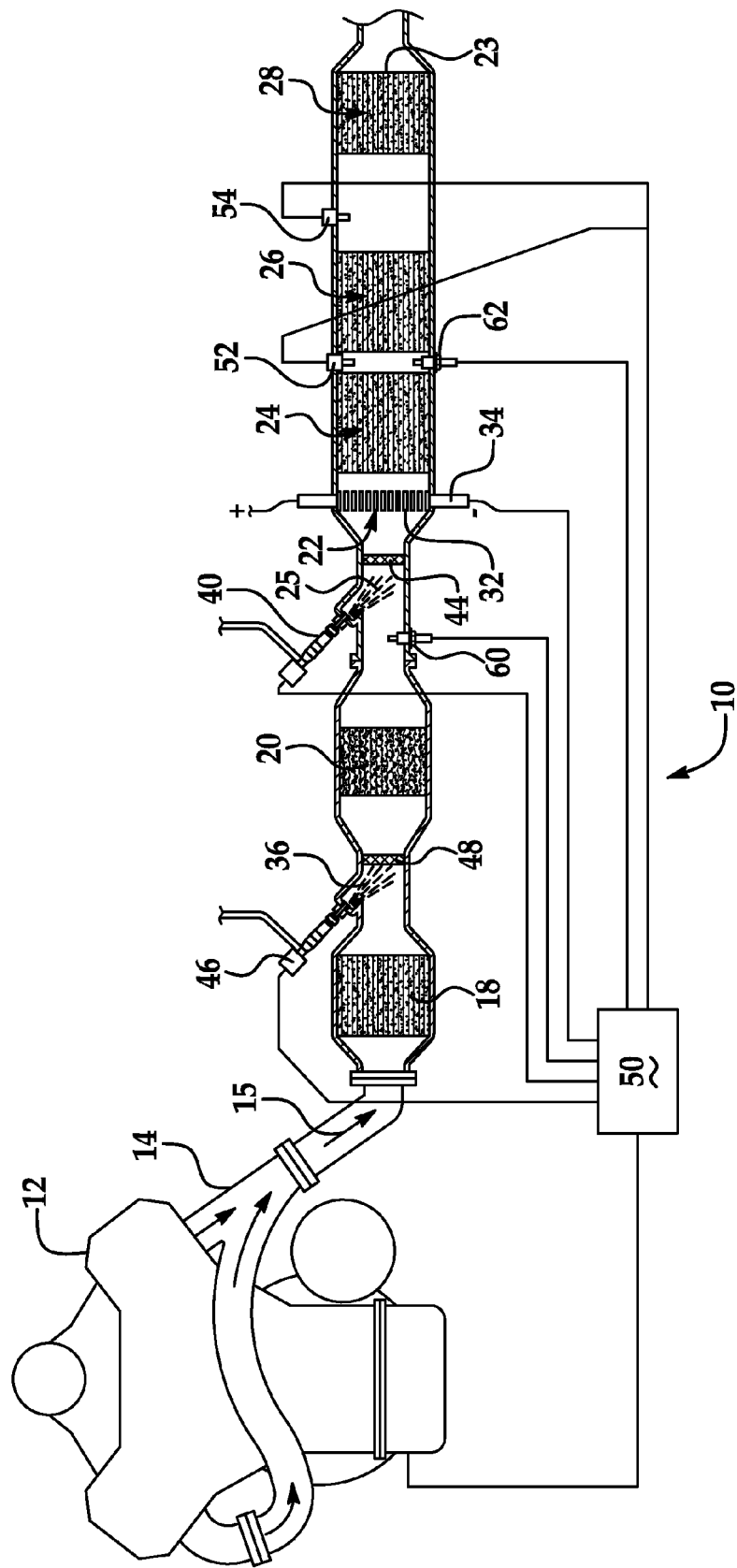
FIG. 1 is a is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline direct injection systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include a first oxidation catalyst device ("OC") 18, a first selective catalytic reduction device ("SCR") 20, an electrically heated catalyst ("EHC") device 22, a second oxidation catalyst device 24, a second SCR device 26, and a particulate filter device ("PF") 28. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The first OC device 18 is located upstream of the first SCR device 20. The first OC device 18 may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum ("Pt"), palladium ("Pd") or other suitable oxidizing catalysts, or combination thereof. The OC device 18 is useful in treating unburned gaseous and non-volatile HC and CO, which are oxidized to form carbon dioxide and water.

The first SCR device 20 may be disposed downstream of the OC device 18. In a manner similar to the OC device 18, the first SCR device 20 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

An ammonia reductant 36 may be supplied from a reductant supply source (not shown) and may be injected into the exhaust gas conduit 14 at a location upstream of the SCR device 20 using an injector 46, or other suitable method of delivery of the reductant to the exhaust gas 15. The reductant 36 may be in the form of a gas, a liquid, or an aqueous urea solution and may be mixed with air in the injector 46 to aid in the dispersion of the injected spray. A mixer or turbulator 48 may also be disposed within the exhaust conduit 14 in close proximity to the injector 46 to further assist in thorough mixing of the reductant 36 with the exhaust gas 15.

An HC or fuel injector 40 may be located upstream of the EHC device 22 in fluid communication with the exhaust gas 15 in the exhaust gas conduit 14. The fuel injector 40 is in fluid communication with an HC supply (not shown), and is configured to introduce an unburned HC 25 into the exhaust gas stream for delivery to the EHC device 22. A mixer or turbulator 44 may also be disposed within the exhaust conduit 14, in close proximity to the HC injector 40, to further assist in thorough mixing of the HC 25 with the exhaust gas 15 to create an exhaust gas and hydrocarbon mixture. The exhaust gas and hydrocarbon mixture is supplied to the EHC device 22.

In the embodiment as illustrated, the EHC device 22 is disposed downstream of both the OC device 18 and the first SCR device 20. The EHC device 22 includes a monolith 32 and an electrical heater 34, where the electrical heater 34 is selectively activated and heats the monolith 32. The electrical heater 34 is connected to an electrical source (not shown) that provides power thereto. In one embodiment, the electrical heater 32 operates at a voltage of about 12-24 volts and at a power range of about 1-3 kilowatts, however it is understood that other operating conditions may be used as well. The EHC device 22 may be constructed of any suitable material that is electrically conductive such as a wound or stacked metal monolith.

An oxidation catalyst compound (not shown) may be applied to the monolith 32 of the EHC device 22 as a wash coat. In one exemplary embodiment, the oxidization catalyst compound may be palladium ("Pd"), copper ("Cu"), or another oxidization catalyst compound that tends to oxidize the reductant 36 from the injector 46 at relatively higher temperatures when compared to some other types of oxidization catalyst compounds. For example, in one embodiment, the oxidation catalyst compound may be applied as a wash coat and contains a palladium based oxidation catalyst compound. Some types of palladium based oxidization compounds tend to oxidize the reductant 36 at temperatures greater than about 250° C. In another embodiment, if a copper based oxidation catalyst is used, some types of copper based oxidation catalyst compounds tend to oxidize the reductant 36 at temperatures greater than about 400° C.

In the embodiment as illustrated, the second OC device 24 is disposed downstream of the EHC device 22. The second OC device 24 may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. In one exemplary embodiment, the oxidization catalyst compound may also be palladium, copper, or another type of oxidation catalyst that generally oxidizes the reductant 36 from the injector 46 at relatively higher temperatures, similar to the oxidization catalyst compound applied to the EHC device 22.

Both the EHC device 22 and the second OC device 24 have a $NO_x$ adsorber catalyst thereon applied as a wash coat. The $NO_x$ adsorber catalyst is configured for selectively adsorbing $NO_x$ below a threshold temperature and substantially releasing $NO_x$ above the threshold temperature. Specifically, the $NO_x$ adsorber catalyst stores $NO_x$ at relatively lower temperatures, and is configured for releasing $NO_x$ as the temperature of the exhaust gas 15 increases. In one embodiment, the threshold temperature at which the $NO_x$ adsorber catalyst substantially releases the $NO_x$ ranges from about 150° C. to about 300° C., however it is to be understood that other temperature ranges may be used as well. In one embodiment, the $NO_x$ adsorber catalyst may be barium zeolite or cerium oxide.

The $NO_x$ adsorber catalyst is configured for adsorbing $NO_x$ following a cold start of the engine 12. In one embodiment, the if the $NO_x$ adsorber catalyst is a passive $NO_x$ adsorber ("PNA"), then once the exhaust gas 15 attains the threshold temperature, $NO_x$ is desorbed by the PNA and released back into the exhaust gas 15. The $NO_x$ released by the PNA travels downstream and is reduced on the second SCR device 26. The second SCR device 26 is disposed downstream of the second OC device 24. The second SCR device 26 is provided for converting the desorbed $NO_x$ from the PNA in the exhaust gas 15 in the presence of the reductant 36.

In yet another embodiment, the $NO_x$ adsorber catalyst is a lean $NO_x$ trap ("LNT"), which includes a $NO_x$ storage or adsorber coating in combination with a three-way catalyst. During rich operating conditions, the exhaust gas 15 is adjusted to provide a reduced oxygen mixture (i.e. rich of stoichiometry) to the LNT. For example, in one embodiment, the fuel injector 40 is selectively activated to introduce the hydrocarbons 25 into the exhaust gas stream for delivery to the LNT. Alternatively, the operating parameters of the engine 12 may be modified to control the hydrocarbon levels in the exhaust gas 15. Specifically, the engine timing and rate/frequency of fueling is modified to deliver excess, unburned fuel into the exhaust gas conduit 14 for mixing with the exhaust gas 15. The three-way catalyst of the LNT then reduces the $NO_x$ into nitrogen ("$N_2$").

The PF device 28 may be disposed downstream of the second SCR 26. The PF device 28 operates to filter the exhaust gas 15 of carbon and other particulates. In various embodiments, the PF device 28 may be constructed using a ceramic wall flow monolith filter 23 that may be packaged in a shell or canister constructed of, for example, stainless steel, and that has an inlet and an outlet in fluid communication with exhaust gas conduit 14. The ceramic wall flow monolith filter 23 may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter 23 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the IC engine 12. It is appreciated that the ceramic wall flow monolith filter is merely exemplary in nature and that the PF device 28 may include other filter devices such as wound or packed fiber filters, open cell foams, sintered metal fibers, etc. The increase in exhaust backpressure caused by the accumulation of particulate matter in the monolith filter 23 typically requires that the PF device 28 is periodically cleaned, or regenerated. Regeneration involves the oxidation or burning of the accumulated carbon and other particulates in what is typically a high temperature environment (>600° C.).

A control module 50 is operably connected to and monitors the engine 12 and the exhaust gas treatment system 10 through a number of sensors. The control module 50 is also operably connected to the electrical heater 34 of the EHC device 22, the engine 12, the fuel injector 40, and the reductant injector 46. FIG. 1 illustrates the control module 50 in communication with two temperature sensors 52 and 54 located in the exhaust gas conduit 14. The first temperature sensor 52 is situated upstream of the second SCR device 26, and the second temperature sensor 54 is located downstream of the second SCR device 26. The temperature sensors 52 and 54 send electrical signals to the control module 50 that each indicate the temperature in the exhaust gas conduit 14 in specific locations. The control module 50 is also in communication with two $NO_x$ sensors 60 and 62 that are in fluid communication with the exhaust gas conduit 14. Specifically, the first $NO_x$ sensor 60 is located upstream of the second OC device 24 to detect a $NO_x$ concentration level. The second $NO_x$ sensor 62 is located downstream of the second OC device 24 to detect the $NO_x$ concentration level.

The control module 50 includes control logic for monitoring the first temperature sensor 52 that is situated downstream of the second OC device 24, and determining the temperature of the second OC device 24 based on the first temperature sensor 52. The control module 50 also includes control logic for monitoring both the first temperature sensor 52 and the second temperature sensor 54 and for calculating a temperature profile of the second SCR device 26. Specifically, the first temperature sensor 52 and the second temperature sensor 54 are averaged together to create the temperature profile of the second SCR device 26. The control module 50 also includes control logic for selectively activating or deactivating the EHC device 22 based on the temperature profile of the second SCR device 26. Specifically, if the temperature profile of the second SCR device 26 is within a specified range of a light-off or minimum operating temperature, then the electrical heater 34 is activated, and heats the EHC device 22. The temperature at which the electrical heater 34 is activated at is also referred to as an activation temperature of the second SCR device 26. The activation temperature is a value that is stored in a memory of the control module 50. For example, in one embodiment, the specified range may be about 30-50° C. within the light-off temperature of the second SCR device 26. The specified range indicates that the second SCR device 26 is approaching the respective light-off temperature. Once the second SCR device 26 is heated to the respective light-off temperature, this generally effectively reduces the amount of $NO_x$ in the exhaust gas 15.

When activated, the EHC device 22 provides heat to the monolith 32 of the EHC device 22 as well as the second OC device 24, which in turn heats the monolith 32 of the EHC device 22 and the second OC device 24 to the threshold temperature. Specifically, activation of the EHC device 22 heats the $NO_x$ adsorber catalyst to the threshold temperature to substantially release or desorb $NO_x$. In one embodiment, the fuel injector 40 may also be activated with the EHC device 22 to release unburned HC 25 into the exhaust gas 15.

The control module 50 includes control logic for determining an amount of $NO_x$ in the exhaust gas 15 that is stored on the EHC device 22 and the second OC device 24. The amount of $NO_x$ in the exhaust gas 15 stored or adsorbed by the $NO_x$ adsorber catalyst on the EHC device 22 and the second OC device 24 may be calculated based on the output of the first $NO_x$ sensor 60, the second $NO_x$ sensor 62, and the temperature of the second OC device 24. A threshold amount of $NO_x$ may be stored on the monolith 32 of the EHC device 22 and the second OC device 24, where the threshold amount of $NO_x$ represents a maximum amount of $NO_x$ that the $NO_x$ adsorber catalyst is configured to hold or adsorb. The threshold amount of $NO_x$ is a value that is stored in the memory of the control module 50. In one embodiment, if the amount of $NO_x$ in the exhaust gas 15 that is stored on the EHC device 22 and the second OC device 24 is above the threshold amount of $NO_x$, and if the second SCR device 26 is above the activation temperature, the control module 50 includes control logic for activating the EHC device 22.

Once the $NO_x$ adsorber catalyst releases or desorbs the $NO_x$, the $NO_x$ is converted into nitrogen by the second SCR device 26 in the presence of the reductant 36. Specifically, activation of the EHC 22 also provides heat to the second SCR device 26. Thus, the second SCR device 26 is heated by the EHC device 22 and is generally at the respective light-off temperature after the EHC device 22 substantially releases or desorbs $NO_x$. It should be noted that in one embodiment, the oxidation catalyst compound applied to the EHC device 22 and the second OC device 24 generally oxidizes the reductant 36 from the injector 46 at relatively higher temperatures (i.e., typically at about 250° C. to about 400° C.). That is, the EHC device 22 and the second OC device 24 may oxidize the reductant 36 at temperatures that are relatively higher than the light-off temperature of the second SCR device 26 (which is typically about 200° C.). Thus, the reductant 36 from the injector 46 does not generally oxidize in the second OC device 24 at the light-off temperature of the second SCR device 26, and instead passes through or slips to the second SCR device 26.

Activation of the EHC device 22 may also provide heat to the PF device 28. The heat provided by the EHC device 22 aids in heating the PF device 28 when relatively high temperature are required during regeneration. Thus, because the EHC device 22 supplies heat to the PF device 28, this reduces the amount of hydrocarbons or fuel 25 that are injected into the exhaust gas stream 15 by the fuel injector 40 or the engine 12. Therefore, activation of the EHC device 22 may also improve fuel economy of a vehicle (not shown).

Following engine start up, the first SCR device 20 is not at the respective light-off temperature, and therefore does not effectively filter $NO_x$. Instead, the $NO_x$ adsorber catalyst applied to at least one of the monolith 32 of the EHC device 22 and the second OC device 24 is configured for adsorbing $NO_x$ following engine start up. The control module 50 includes control logic for selectively activating the EHC device 22 based on the temperature profile of the second SCR device 26. Specifically, if the temperature profile of the second SCR device 26 is within a specified range within the light-off or minimum operating temperature (also referred to as the activation temperature) then the electrical heater 34 is activated to heat the monolith 32 of the EHC device 22 and the OC device 24. This in turn releases the $NO_x$ adsorbed by the $NO_x$ adsorber catalyst. The second SCR device 26 is heated to the respective light-off temperature by activation of the EHC device 22. Thus, the heated second SCR device 26 converts the reductant 36 and generally effectively lowers or substantially eliminates the amount of $NO_x$ that has been released by the $NO_x$ adsorber catalyst. Therefore, the combination of the EHC device 22 and the $NO_x$ adsorber catalyst improves $NO_x$ efficiency following engine start up when compared to an exhaust treatment system that does not include an EHC device or a $NO_x$ adsorber catalyst. The EHC device 22 and the $NO_x$ adsorber catalyst may also improve fuel economy of the engine 12 as well.

Figure 2:
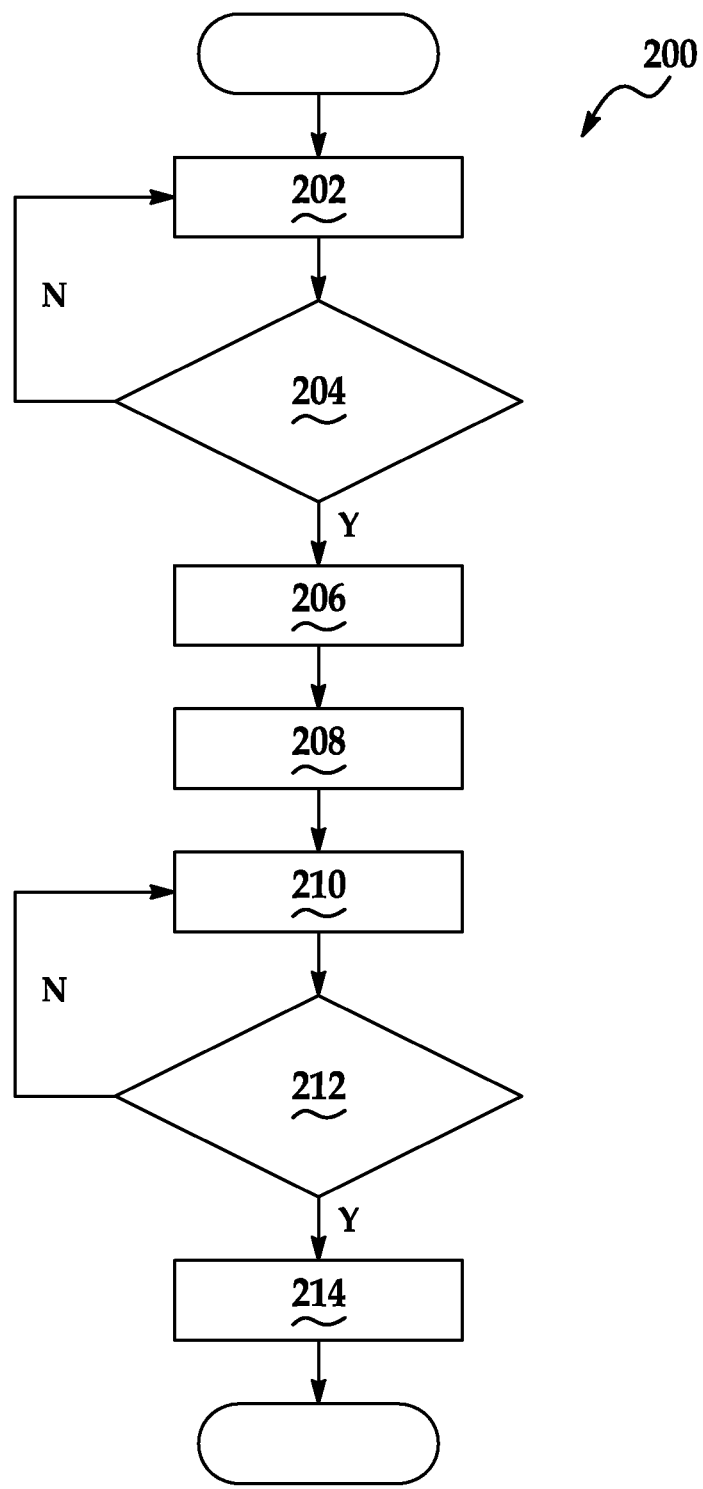
FIG. 2 is a process flow diagram illustrating a method of activating an electrically heated catalyst ("EHC") illustrated in FIG. 1.

A method of operating the exhaust gas treatment system 10 will now be explained. Referring to FIG. 2, an exemplary process flow diagram illustrating an exemplary process of operating the exhaust gas treatment system 10 is generally indicated by reference number 200. Process 200 begins at step 202, where a control module 50 includes control logic for monitoring the temperature profile of a second SCR device 24. Specifically, referring to FIG. 1, the control module 50 includes control logic for monitoring a first temperature sensor 52 and a second temperature sensor 54 and for calculating a temperature profile of the second SCR device 26. Specifically, the first temperature sensor 52 and the second temperature sensor 54 are averaged together to create the temperature profile of the second SCR device 26. Process 200 may then proceed to step 204.

In step 204, the control module 50 includes control logic for determining if the second SCR device 24 is above or below an activation temperature of the second SCR device 24. In the event the second SCR device 24 has not attained the activation temperature, then process 200 returns to step 202. In the event the second SCR device 24 has reached the light-off temperature, then process 200 may proceed to step 206.

In step 206, the control module 50 includes control logic for activating an EHC device 22. Specifically, with reference to FIG. 1, the EHC device 22 includes a monolith 32 and an electrical heater 34, where the electrical heater 34 is selectively activated to heat the monolith 32. Process 200 may then proceed to step 208.

In step 208, the control module 50 includes control logic for activating a fuel injector 40. The fuel injector 40 is in fluid communication with an HC supply (not shown), and is configured to introduce an unburned HC 25 into the exhaust gas stream for delivery to the EHC device 22. It should be noted that step 208 is optional and may be omitted in some embodiments. Process 200 may then proceed to step 210.

In step 210, the control module 50 includes control logic for monitoring the temperature of a second OC device 24.

With reference to FIG. 1, the control module 50 includes control logic for monitoring the first temperature sensor 52 that is situated downstream of the second OC device 24, and determining the temperature of the second OC device 24 based on the first temperature sensor 52. Process 200 may then proceed to step 212.

In step 212, the control module 50 includes control logic for determining if the temperature of the second OC device 24 is at or exceeds a threshold temperature. The threshold temperature represents the temperature at which the $NO_x$ adsorber catalyst that is applied to the second OC device 24 and a monolith 32 of the EHC device 22 substantially releases the $NO_x$ that is adsorbed therein. In one embodiment, the threshold temperature ranges from about 150° C. to about 300° C., however it is to be understood that other temperature ranges may be used as well. If the threshold temperature does not exceed the threshold temperature, process 200 returns to step 210. In the event the threshold temperature is at or exceeds the threshold temperature, then process 200 may then proceed to step 214.

In step 214, the control module 50 includes control logic for deactivating the EHC device 22. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from the internal combustion engine, the exhaust gas containing oxides of nitrogen ("$NO_x$");
    an upstream selective catalytic reduction ("SCR") device in fluid communication with the exhaust gas conduit and configured to receive the exhaust gas;
    an electrically heated catalyst ("EHC") device in fluid communication with the exhaust gas conduit and configured to receive the exhaust gas, the EHC device located downstream of the upstream SCR device and selectively activated to produce heat, the EHC device including a monolith;
    an oxidation catalyst ("OC") device in fluid communication with the exhaust gas conduit, the OC device selectively heated by the EHC device, and wherein at least one of the monolith of the EHC device and the OC device have a $NO_x$ adsorber catalyst disposed thereon for adsorbing $NO_x$ below a threshold temperature and substantially releasing $NO_x$ above the threshold temperature;
    a downstream SCR device in fluid communication with the exhaust gas conduit and configured to receive the exhaust gas, the downstream SCR device being located downstream of the OC device, the downstream SCR device including a downstream SCR activation temperature based on a downstream SCR temperature profile, the downstream SCR activation temperature indicating the downstream SCR device is within a specified range of a respective-light-off temperature of the downstream SCR device; and a control module in communication with the EHC device, the control module comprising:
a computer processor;
a control logic for determining the downstream SCR temperature profile;
a control logic for activating the EHC device if the downstream SCR temperature profile is above the downstream SCR activation temperature; and
a control logic for deactivating the EHC device if the OC temperature is above the threshold temperature.

2. The exhaust gas treatment system of claim 1, further comprising a hydrocarbon supply connected to and in fluid communication with the exhaust gas conduit, wherein the hydrocarbon supply is selectively activated for delivery of a hydrocarbon and formation of an exhaust gas and hydrocarbon mixture therein, the exhaust gas and hydrocarbon mixture delivered to the EHC device and the OC device.

3. The exhaust gas treatment system of claim 2, wherein the control module includes control logic for activating the hydrocarbon supply if the downstream SCR temperature profile is above the downstream SCR activation temperature.

4. The exhaust gas treatment system of claim 1, wherein the OC device and the monolith of the EHC device have at least one of palladium and copper washcoat that are each an oxidization catalyst compound disposed thereon.

5. The exhaust gas treatment system of claim 4, wherein a reductant injector is in fluid communication with the exhaust gas conduit and is in signal communication with the control module, the reductant injector located upstream of the upstream SCR device, wherein the reductant injector is configured for dosing a reductant.

6. The exhaust gas treatment system of claim 1, wherein the $NO_x$ adsorber catalyst is one of a passive $NO_x$ adsorber ("PNA") and a lean $NO_x$ trap ("LNT").

7. The exhaust gas treatment system of claim 1, further comprising:
a first temperature sensor situated upstream of the downstream SCR device; and
a second temperature sensor situated downstream of the downstream SCR device.

8. The exhaust gas treatment system of claim 7, wherein the control module includes a control logic for monitoring the first temperature sensor and the second temperature sensor.

9. The exhaust gas treatment system of claim 8, wherein the control module includes a control logic for calculating the downstream SCR temperature profile based on signals from the first temperature sensor and the second temperature sensor, wherein the temperatures of the first temperature sensor and the second temperature sensor are averaged together to create the SCR temperature profile.

10. The exhaust gas treatment system of claim 8, wherein the first temperature sensor is used to calculate an OC temperature of the OC device.

11. The exhaust gas treatment system of claim 1, further comprising an upstream OC device that is in fluid communication with the exhaust gas conduit, wherein the upstream OC device is located upstream of the upstream SCR device.

12. An exhaust gas treatment system for an internal combustion engine, comprising:
an exhaust gas conduit in fluid communication with, and configured to receive an exhaust gas from the internal combustion engine, the exhaust gas containing oxides of nitrogen ("$NO_x$") and hydrocarbons;

an upstream oxidation catalyst ("OC") device that is in fluid communication with the exhaust gas conduit, wherein the upstream OC device induces oxidization of hydrocarbons in the exhaust gas;
an upstream selective catalytic reduction ("SCR") device in fluid communication with the exhaust gas conduit and configured to receive the exhaust gas, the upstream OC device located upstream of the upstream SCR device;
an electrically heated catalyst ("EHC") device in fluid communication with the exhaust gas conduit and configured to receive the exhaust gas, the EHC device located downstream of the upstream SCR device and selectively activated to produce heat, the EHC device including a monolith;
a downstream OC device in fluid communication with the exhaust gas conduit, the downstream OC device selectively heated by the EHC device, and wherein at least one of the monolith of the EHC device and the downstream OC device have a $NO_x$ adsorber catalyst disposed thereon for adsorbing $NO_x$ below a threshold temperature and substantially releasing $NO_x$ above the threshold temperature, the $NO_x$ adsorber catalyst being one of a passive $NO_x$ adsorber ("PNA") and a lean $NO_x$ trap ("LNT");
a downstream SCR device in fluid communication with the exhaust gas conduit and configured to receive the exhaust gas, the downstream SCR device being located downstream of the downstream OC device, the downstream SCR device including a downstream SCR activation temperature based on a downstream SCR temperature profile, the downstream SCR activation temperature indicating the downstream SCR device is within a specified range of a respective-light-off temperature of the downstream SCR device;
a first temperature sensor situated downstream of the downstream OC device and situated upstream of the downstream SCR device;
a second temperature sensor situated downstream of the downstream SCR device; and
a control module in communication with the EHC device, the control module comprising:
a computer processor;
a control logic for calculating the downstream SCR temperature profile based on signals from the first temperature sensor and the second temperature sensor, wherein the temperatures of the first temperature sensor and the second temperature sensor are averaged together to create the SCR temperature profile; and
a control logic for activating the EHC device if the downstream SCR temperature profile is above the downstream SCR activation temperature.

13. The exhaust gas treatment system of claim 12, further comprising a hydrocarbon supply connected to and in fluid communication with the exhaust gas conduit, wherein the hydrocarbon supply is selectively activated for delivery of a hydrocarbon and formation of an exhaust gas and hydrocarbon mixture therein, the exhaust gas and hydrocarbon mixture delivered to the EHC device and the downstream OC device.

14. The exhaust gas treatment system of claim 13, wherein the control module includes control logic for activating the hydrocarbon supply if the downstream SCR temperature profile is above the downstream SCR activation temperature.

15. The exhaust gas treatment system of claim 12, wherein the downstream OC device and the monolith of the EHC device have at least one of palladium and copper washcoat that are each an oxidization catalyst compound disposed thereon.

16. The exhaust gas treatment system of claim 15, wherein a reductant injector is in fluid communication with the exhaust gas conduit and is in signal communication with the control module, the reductant injector located upstream of the upstream SCR device, wherein the reductant injector is configured for dosing a reductant.

17. An exhaust gas treatment system for an internal combustion engine, the exhaust gas treatment system comprising:
   an exhaust gas conduit in fluid communication with the internal combustion engine;
   an upstream oxidation catalyst ("OC") device in fluid communication with the exhaust gas conduit;
   an upstream selective catalytic reduction ("SCR") device in fluid communication with the exhaust gas conduit downstream of the upstream OC device;
   an electrically heated catalyst ("EHC") device in fluid communication with the exhaust gas conduit downstream of the upstream SCR device, the EHC including an NOx adsorber catalyst applied thereon;
   a downstream OC device in fluid communication with the exhaust gas conduit downstream of the EHC device, the downstream OC device including an NOx adsorber catalyst applied thereon;
   a first temperature sensor situated downstream of the downstream OC device;
   a downstream SCR device in fluid communication with the exhaust gas conduit downstream of the first temperature sensor;
   a second temperature sensor situated downstream of the downstream SCR device;
   a particulate filter (PF) device in fluid communication with the exhaust gas conduit downstream of the second temperature sensor; and
   a control module in communication with the EHC device and the first and second temperature sensors, the control module comprising:
      a computer processor;
      a control logic for determining a temperature profile of the downstream SCR based on signals from the first and second temperature sensors, wherein the temperatures sensed by the first and second temperature sensors are averaged to create the SCR profile; and
      a control logic for activating the EHC device if the downstream SCR temperature profile is above an activation temperature of the downstream SCR.

18. The exhaust gas treatment system of claim 17, further comprising:
   a first NOx sensor situated downstream of the upstream SCR device and situated upstream of the EHC device; and
   a second NOx sensor situated downstream of the downstream OC device and situated upstream of the downstream SCR device.

19. The exhaust gas treatment system of claim 18, wherein the control module further comprises a control logic for determining an amount of NOx in exhaust gas from the engine that is stored on the EHC device and the downstream OC device based on signals from the first and second NOx sensors and the temperature of the downstream OC device.

20. The exhaust gas treatment system of claim 17, further comprising:
   a reductant injector in fluid communication with the exhaust gas conduit downstream of the upstream OC device and upstream of the upstream SCR device; and
   a hydrocarbon fuel injector in fluid communication with the exhaust gas conduit downstream of the upstream SCR device and upstream of the EHC device.

* * * * *